United States Patent [19]

Jorgensen

[11] Patent Number: 4,856,730
[45] Date of Patent: Aug. 15, 1989

[54] LINE SPOOL FOR FISHING REELS

[76] Inventor: Scott M. Jorgensen, P.O. Box 181, Adel, Iowa 50003

[21] Appl. No.: 156,550

[22] Filed: Feb. 17, 1988

[51] Int. Cl.⁴ .................... B65H 75/24; B65H 75/14
[52] U.S. Cl. ........................... 242/118.4; 242/118.6; 242/312
[58] Field of Search ............... 242/118.4, 118.5, 118.6, 242/118, 84.2 R, 84.21 R, 84.1 R, 84.1 L, 159

[56] References Cited

U.S. PATENT DOCUMENTS

| | | | |
|---|---|---|---|
| 2,000,372 | 5/1935 | Beck | 242/118.4 |
| 2,687,855 | 8/1954 | Shakespeare et al. | 242/84.21 R |
| 2,715,504 | 8/1955 | Monty | 242/84.21 R |
| 3,175,783 | 3/1965 | Ketterer | 242/118.4 |
| 3,987,976 | 10/1976 | Lilland | 242/84.21 R |
| 4,416,428 | 11/1983 | Noda | 242/84.21 R |
| 4,561,604 | 12/1985 | Matsushima | 242/84.2 R |

*Primary Examiner*—Stanley N. Gilreath
*Attorney, Agent, or Firm*—Alan Ruderman

[57] ABSTRACT

A spool for fishing reels for permitting full use of the fishing line wound thereon and eliminates the increased drag and resistance normally resulting when casting after the amount of line on the reel is reduced to low levels. The spool has an inner flange and an outer flange separated by a hub upon which fishing line may be wound, the outer flange being formed from two plate members one of which is substantially larger than the other and removably attached thereto when the amount of line on the reel is more than a predetermined amount. The smaller plate member is permanently attached to the hub of the spool and the inner surface of the smaller plate forms a continuous with the removable plate member when the latter is attached thereto. The fixed plate member and the removable plate member have interlocking cooperating surfaces and a single reel lock may selectively attach the spool to a reel mounting shaft in either configuration.

5 Claims, 1 Drawing Sheet

LINE SPOOL FOR FISHING REELS

BACKGROUND OF THE INVENTION

This invention relates to fishing reels and more particularly to a spool for spinning reels for reducing the drag on the fishing line when casting after the amount of line on the reel has reached a predetermined low level.

Spinning type fishing reels wherein the fishing line is paid-out off the end of a nonrotatable spool and also spin casting type fishing reels wherein the fishing line is paid-out on a rotatable spool store and retrieve the line on the spool. Such spools comprise a hub fixed to and disposed between a pair of spaced apart flanges or spool caps. The fishing line with the lure on the end thereof is paid-out over the periphery of the outer or forward flange with relatively little resistance or dray when the spool carries a full supply of line such that the line may easily be released over the outer flange. However, as the amount of line on the spool is reduced due to line breakage or removal of portions of the line when it becomes crimped, tangled or frayed, and the level of the line winding is reduced relative to the diameter of the outer flange, a substantially increased resistance or drag results on the line as it is cast over the outer flange. As the amount of line is reduced and the drag is increased a greater force must be applied by the angler when casting out the line. This effects the accuracy of casting and the effectiveness of the angler. For this reason, it is conventional to wastefully discard a portion of the line close to the hub once the amount of line is reduced to the point where the force required for casting is increased to an uncomfortable level.

Although this problem has been recognized in the prior art, no satisfactory solution has been found. For example, in Witteborg U.S. Pat. No. 3,870,245 a reserve supply of line is wound about the hub and a slotted innular insert is placed about the reserve supply, an amount of the line extending through the slot and wound onto the insert. When the amount of line on the insert is reduced to a nonfunctional level, more line is drawn out from the reserve supply and wound onto the insert. However, because of the insert and because the insert itself must be journalled on mounts, the capacity of the spool is reduced, thereby reducing the effectiveness of that proposal.

SUMMARY OF THE INVENTION

Consequently, it is a primary object of the present invention to provide a spool for fishing lines and particularly for spinning reels which permits full use of the fishing line on the reel without reducing the accuracy in casting when the amount of line on the reel is low.

It is another object of the present invention to provide a spool for fishing spinning reels which eliminates the increased drag and resistance normally resulting when casting after the amount of line on the reel is reduced to low levels.

It is a further object of the present invention to provide a fishing reel spool comprising an inner flange and an outer flange separated by a hub upon which fishing line may be wound, the outer flange comprising two plate members, one of the plate members being enlarged relatively to the other and adapted to be connected to the smaller member when the amount of line on the hub is above a predetermined amount and to be disconnected and removed therefrom when the amount of line on the hub is below the predetermined amount.

It is a still further object of the present invention to provide a spool for fishing spinning reels wherein the outer or forward flange or cap of the spool comprises a relatively large diameter plate member substantially equal to a fully wound line on the hub of the spool and removably connected to a smaller diameter plate, the smaller plate being attached to the hub of the spool and having a diameter substantially equal to a predetermined level of wound line on the hub such that when the line on the hub is reduced to the predetermined level the larger diameter plate may be removed.

Accordingly, the present invention provides a spool for fishing reels, and in particular spinning reels, wherein the spool comprises a hub on which the fishing line may be wound, the hub being disposed between an inner and an outer flange, the outer flange comprising two plate members, one of the plate members being enlarged relative to the other and adapted to be connected to the smaller member when the amount of line on the hub is above a predetermined amount and to be disconnected therefrom and removed when the amount of line on the hub is below the predetermined amount. The smaller plate member is attached to and may be formed as part of the hub of the spool and has a diameter substantially equal to the predetermined level of wound line on the hub such that when the line on the hub is reduced to the predetermined level the larger diameter plate member may be removed from its connection with the smaller diameter member so that when casting with the amount of line on the hub substantially at or below the predetermined level, the drag and resistance in the line cast out over the smaller diameter member is substantially the same as the fully wound line when cast over the larger diameter member.

The two plate members have cooperating surfaces adapted to abut and closely fit together as a unit when connected, these surfaces being the outer face of the smaller plate and a cooperating inner face of the larger plate. Additionally, the interior surface of the smaller plate member and the non-abutting portion of the interior surface of the larger plate member are configured such as to smoothly form a continuation of one from the other when the plate members are connected together.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
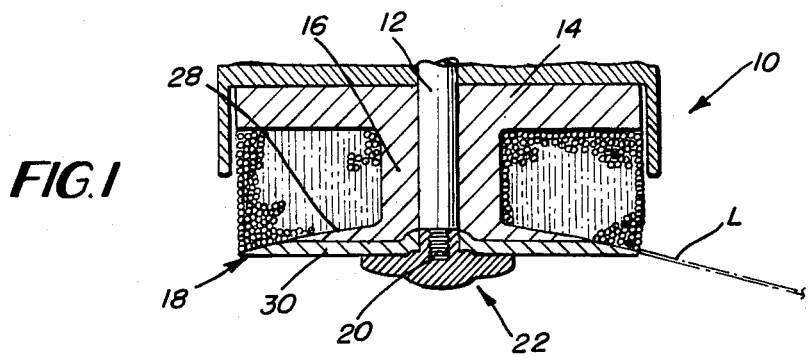
FIG. 1 is a cross sectional view taken substantially through the center of the hub of a fishing reel spool constructed in accordance with the principles of the present invention, the spool being fully assembled with a full line wound thereon.
Figure 2:
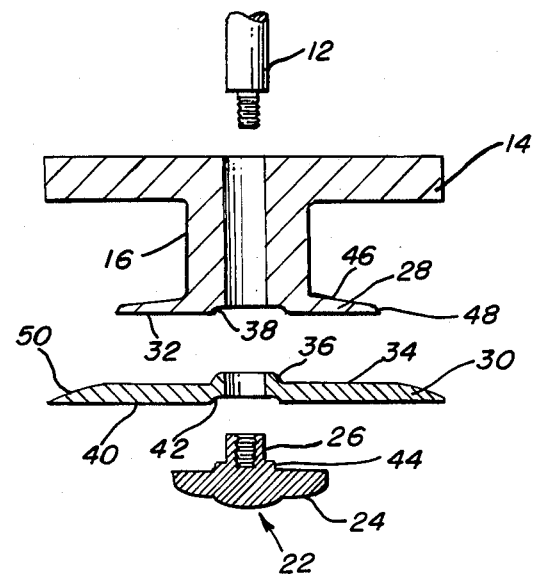
FIG. 2 is a disassembled cross sectional view of the spool of FIG. 1 with the line removed.
Figure 3:
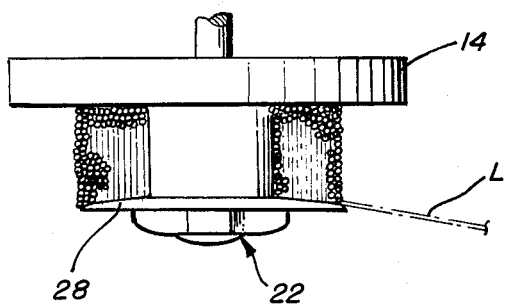
FIG. 3 is an elevated view of the spool of FIG. 1, but with the full line plate member removed and illustrating the level of the amount of line on the hub to be substantially equal to the predetermined level, the yarn windings being partly broken away.

Referring now to the drawings, a spinning type fishing reel spool generally indicated at 10 is illustrated, the spool being mounted on a mounting shaft 12 which is connected to the frame or housing of a conventional reel (only a portion of which is illustrated).

The spool 10 comprises an inner flange or base 14 preferably having an integral or unitary hub 16 and outer flange means 18. The mounting shaft 12 extends through a bore in the base 14 and the hub 16 and has an externally threaded end 20 of reduced diameter which is threadily received within a reel lock 22, the reel lock being in the form of a cap nut 24 having a boss 26 extending therefrom. The boss 26 preferably has the same diameter as the major diameter of the mounting shaft 12 and extends through a bore in the outer flange means 18 and threadily captures the end 20 of the shaft 12 to lock the spool to the reel.

Conventionally, the outer flange means 18 comprises a flange unitary with the hub 16, the diameter of the flange being such that a full supply of fishing line L wound on the hub will be coiled substantially to the level of the periphery of the flange, and such diameter may be substantially equal to that of the base member 14. Thus, when the hub is fully wound with line, the line can be readily cast over the periphery of the flange, but when the amount of line on the hub is substantially reduced the line must be cast from a lower wound level and will encounter increased resistance and drag as it must be released and fly the greater distance over the periphery, and in fact, as it contacts interior surfaces of the flange.

In accordance with the present invention the flange means 18 is formed as two members, the first of the members 28, which may be integral or unitary with the hub 16, is effectively a small diameter plate while the second member 30 is a larger diameter plate. The flange members and hub may be formed from metal as illustrated, or from a synthetic plastic material. The outer peripheral diameter of the second plate or removable member 30 may be substantially equal to that of the prior art flanges so that the same amount of fishing line may be wound on the hub 16 when the plate member 30 is in place. The first or fixed plate member 28, however, has a diameter substantially equal to the level of line wound on the hub where the increase in resistance and drag would in the prior art be such that the effectiveness of casting would begin to be reduced beyond a tolerable amount.

Thus, as illustrated, the first and second plate members 28, 30 have respective outer and inner surfaces 32, 34 which may cooperatively abut so that the member 30 may be attached to the member 28 by means of the reel lock 22. Additionally, the inner surface 34 of the member 30 preferably includes a central protuberance or boss 36 which may be received within a cooperating recess 38 in the central portion of the member 28 so that the plate members 28, 30 may be interlocked together. The outer surface 40 of the second plate member 30 may also include a recess 42 for receiving a boss 44 on the reel lock 22 between the cap 24 and the threaded boss 26, the boss 44 having the same configuration as that of the boss 36. The recess 42 is substantially the same shape and size as the recess 38, and thus is the complement in size and shape or conjugate of the boss 36 and the boss 44. Consequently, the same reel lock 22 may be utilized to lock the spool to the reel whether the larger plate member 30 is mounted on the spool or removed therefrom.

Furthermore, the smaller plate member 28 has a smooth line guide bevel at its inner surface 46 extending to its outer periphery 48 and the inner surface of the outer plate member 30 has a similarly contoured smooth bevel 50 extending from adjacent the outer periphery to the diametric location where the outer periphery 48 terminates. Thus, when the larger plate member 30 is mounted on the spool, as illustrated in FIG. 1, the surfaces 46 and 50 form a smooth continuation of one from the other and no additional resistance or drag occurs as a result of the attachment. Accordingly, line cast over the outer periphery of the larger plate member 30 when the amount of line on the spool is between the full amount and the predetermined amount at the selected diameter of the periphery 50 is not effected by the present invention.

In operation, when the full supply of line is utilized for casting, the plate member 30 is installed on the spool and casting occurs in the usual manner. However, due to line breakage, or selected removal of line due to fraying or the like, when the level of line wound on the hub of the spool reaches that of the diameter at the periphery 48 of the smaller plate member 28, the reel lock 22 is removed to permit removal of the plate member 30 and after the plate member 30 has been removed the reel lock is again secured to the mounting shaft 12, albeit more rotations of the reel lock are required to secure it to the shaft 12 than when the plate 30 is in plate. Casting can then proceed in the usual manner without the increased resistance and drag encountered in prior art spools.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A spool for fishing reels permitting use of substantially all line wound thereon when casting, said spool comprising an inner flange and an outer flange spaced apart by a hub, said hub being adapted for receiving wound line thereon, said outer flange comprising a fixed plate member disposed adjacent said hub and having an outer wall surface and an inner wall surface, said inner wall surface extending from said hub for engaging and contacting line wound on said hub, said fixed plate member having a circumferential periphery of a diameter permitting a predetermined amount of line wound on said hub to be contained thereon, a removable plate member having an inner wall surface and an outer wall surface, the inner wall surface of said removable plate member and of the outer wall surface of said fixed plate member having cooperating surfaces for permitting said removable plate member to be mounted in abutting relationship with the outer wall surface of said fixed plate member, said removable plate member having a circumferential periphery of a diameter substantially larger than that of the fixed plate member such that when mounted in abutting relationship with said fixed plate member a greater amount of line than said predetermined amount may be mounted on said hub, a bore extending through said flanges and said hub for receiving a real mounting shaft, a reel lock having means for attachment to said shaft to secure the spool to said shaft selectively with the removable plate member thereon and with the removable plate member removed therefrom, said outer wall surface of said fixed plate member and said outer wall surface of said removable plate in the vicinity of said bore comprising substantially identical configurations both in shape and size and said inner wall surface of said removable plate member in the vicinity of said bore comprising a shape and size complementary to said configurations for permitting an interlocking connection between said inner wall surface of said removable plate member with the outer wall surface of said fixed plate member, and said reel lock including means for interlocking with the outer wall surface of said fixed plate member and with the outer wall surface of said removable plate member selectively, whereby when the amount of line on said spool is greater than said predetermined amount said removable plate member is attached to said spool and may be removed therefrom when the amount of line on said spool is no more than said predetermined amount.

2. A spool for fishing reels as recited in claim 1, wherein said inner flange, said hub and said fixed plate member comprise an integral unit.

3. A spool for fishing reels as recited in claim 1, wherein said outer wall surface of said fixed plate member and said outer wall surface of said removable plate member have a recess in the vicinity of the respective bores, and the inner wall surface of said removable plate member in the vicinity of the bore and the reel lock means for interlocking each have a boss.

4. A spool for fishing reels as recited in claim 3, wherein said inner flange, said hub and said fixed plate member comprise an integral unit.

5. A spool for fishing reels as recited in claim 1, wherein the inner wall surface of said fixed plate member and the inner wall surface of said removable plate member from the periphery thereof to a location equivalent to the diameter of the periphery of the fixed plate member form a continuation of one from the other when the removable plate member is attached to the spool.

* * * * *